US005979496A

United States Patent [19]
Markham

[11] Patent Number: 5,979,496
[45] Date of Patent: Nov. 9, 1999

[54] ADAPTOR FOR ENGAGING A GAS PRESSURE SOURCE TO A GAS PORT

[75] Inventor: Trevor K. Markham, Bexar County, Tex.

[73] Assignee: Daniel A. Holt, San Antonio, Tex.

[21] Appl. No.: 09/002,442

[22] Filed: Jan. 2, 1998

[51] Int. Cl.[6] .......... F16K 31/122
[52] U.S. Cl. .......... 137/505; 138/45; 251/148
[58] Field of Search .......... 137/505.25, 505; 251/148; 138/45

[56] References Cited

U.S. PATENT DOCUMENTS

| | | | |
|---|---|---|---|
| 614,441 | 11/1898 | Burnett . | |
| 1,045,197 | 11/1912 | Schuler . | |
| 1,468,639 | 9/1923 | Kimmel | 138/45 |
| 2,712,458 | 7/1955 | Lipson | 138/45 |
| 2,897,833 | 8/1959 | Seeler . | |
| 3,094,141 | 6/1963 | Maienknecht . | |
| 3,098,501 | 7/1963 | McLeod . | |
| 3,229,723 | 1/1966 | Janton | 138/45 |
| 4,064,899 | 12/1977 | Lehmann . | |
| 4,181,139 | 1/1980 | Martini . | |
| 4,219,017 | 8/1980 | Shamlian et al. . | |
| 4,230,140 | 10/1980 | Hart . | |
| 4,396,032 | 8/1983 | Duchesne et al. . | |
| 4,527,582 | 7/1985 | Buckle et al. . | |
| 4,924,904 | 5/1990 | Carter . | |
| 5,097,860 | 3/1992 | Ferguson et al. . | |
| 5,184,609 | 2/1993 | Hart . | |
| 5,379,761 | 1/1995 | Schuler . | |
| 5,411,053 | 5/1995 | Markham . | |
| 5,522,421 | 6/1996 | Holt . | |

*Primary Examiner*—A. Michael Chambers
*Attorney, Agent, or Firm*—Jackson Walker, L.L.P.

[57] ABSTRACT

A single piece housing with a floating gas sealing member in a gas communication channel between the two ends of the housing, for joining a high pressure gas port to a second gas port in gas sealing relation.

8 Claims, 4 Drawing Sheets

ADAPTOR FOR ENGAGING A GAS PRESSURE SOURCE TO A GAS PORT

FIELD OF THE INVENTION

An adapter to join a nitrogen gas regulator to a tank of compressed $CO_2$ gas, more particularly, a single piece joinder member adapted to receive at one end thereof the threaded male member of the nitrogen regulator and, at the second end thereof, the threaded male member of a high pressure gas source port in fluid communication with the $CO_2$ bottle.

BACKGROUND OF THE INVENTION

Nitrogen and $CO_2$ gas as well as other compressed gases are often used in the air conditioning and refrigeration and welding fields for testing and other purposes. However, regulators for nitrogen gas bottles and for $CO_2$ gas bottles have two different thread sizes. That is, to use a nitrogen regulator on a $CO_2$ gas bottle requires a joinder member having a first and a second end, the two ends having different thread diameters.

Nitrogen regulators typically have a female and a male connector, with the male on the regulator side and carbon dioxide regulators typically have a male to female connector with a female on the regulator side. These standardized connections also use different size threads.

The prior art adapter set forth in the illustrations is made of three pieces: a union threaded first collar (A) (which joins the $CO_2$ bottle through the use of a $CO_2$ nut), a threaded second collar (B) (which joins the nitrogen regulator through the use of a nitrogen connector) and a joinder member (C) (the joinder member being a $CO_2$ nipple) for joining two collars. Typically the joinder member is attached permanently to collar B, as indicated in the accompanying figure, for example, by brazing (Braze). Using three pieces is expensive and the use of the cylindrical joinder piece between the two collars extends the nitrogen regulator away from the cylinder creating a potential safety hazard. When put together and ready for use, the three-piece adapter (the center member being attached to a collar) becomes functionally a two-piece member.

Because of the use of three pieces in constructing the $N_2/CO_2$ adapter and the requirement of brazing, and the undesirable length of the prior art three-piece adapter, utility lies in adapter having fewer pieces which can be more easily and inexpensively constructed and will place the $N_2$ regulator closer to the $CO_2$ cylinder.

The prior art adaptor illustrated seals $N_2$ connector collar (B) having $N_2$ nipple receiving walls (D) to $N_2$ nipple on $N_2$ regulator by joining and tightening $N_2$ female connector collar (B) to $N_2$ nut (G) on regulator to create a gas tight seal between the nipple receiver walls (D) and the "O" ring bearing $N_2$ nipple (H). However, as illustrated in the prior art, a second seal must be created to the male $CO_2$ cylinder port. The prior art accomplishes this by fixing to collar B, a $CO_2$ nipple on joinder member (C), and a captive, freely rotating $CO_2$ nut, namely collar A. Gas tight joinder is accomplished by threading the $CO_2$ nut, collar A onto the threaded male $CO_2$ cylinder port (E) until a tight seal is made to face (F) of $CO_2$ nipple.

In place of this two piece unit the prior art provides, applicant has a floating sealing member, typically a fiber washer, in a single piece housing, with one end of the housing threaded for accepting $CO_2$ connecting port (E) and at the other end for receiving threads of $N_2$ nut (G). The floating sealing member joins $N_2$ nipple (H) with $CO_2$ cylinder port (E).

OBJECTS OF THE INVENTION

Thus, it is an object of the invention to provide an adapter for attaching a nitrogen regulator or pressure gauge, or other low pressure gas port having a captive joinder nut, to a $CO_2$ cylinder or other high pressure gas source, which requires fewer pieces and is more simple to manufacture than the prior art.

SUMMARY OF THE INVENTION

This and other objects are provided for in a single-piece housing into which a fiber washer or other floating sealing member is insertable, the housing having a communication channel therethrough and a first end and a second end, the interior of the first end is threaded to a first diameter and the interior of the second end is thread to typically, a second diameter. The communication channel having walls defining a region in which the washer rides and will seat the housing for, typically, threading the first end thereof to a nitrogen regulator and the second end thereof to a male source port of a $CO_2$ cylinder.

DETAILED DESCRIPTION OF THE PREFERRED EMBODIMENT

Figure 1:
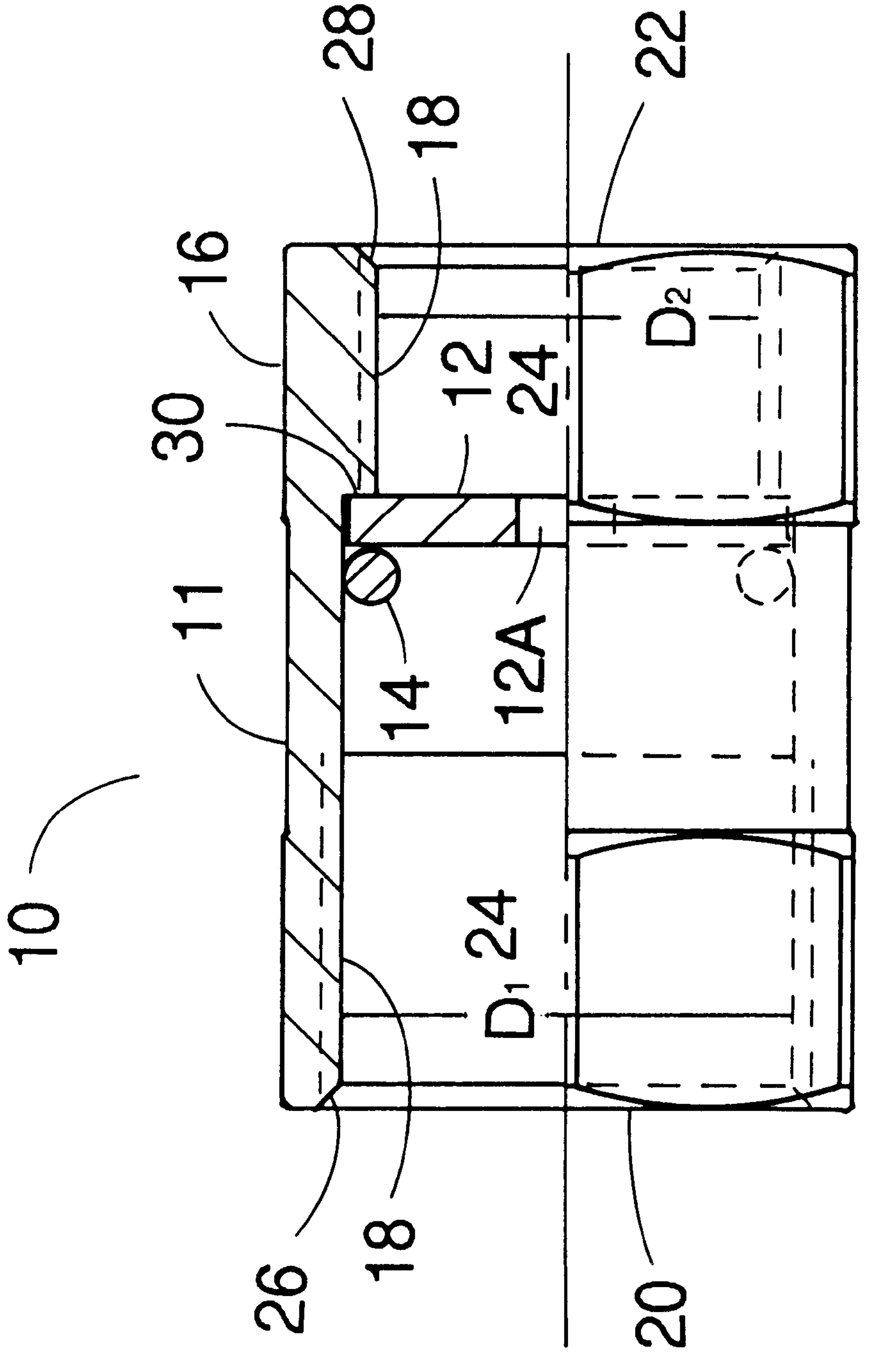
FIG. 1 is a side view of Applicant's present invention.
Figure 1B:
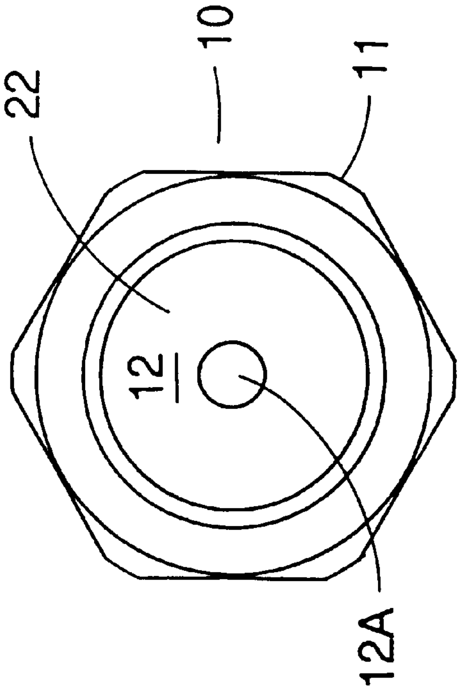
FIG. 1B is another end view of Applicant's present invention.
Figure 1A:
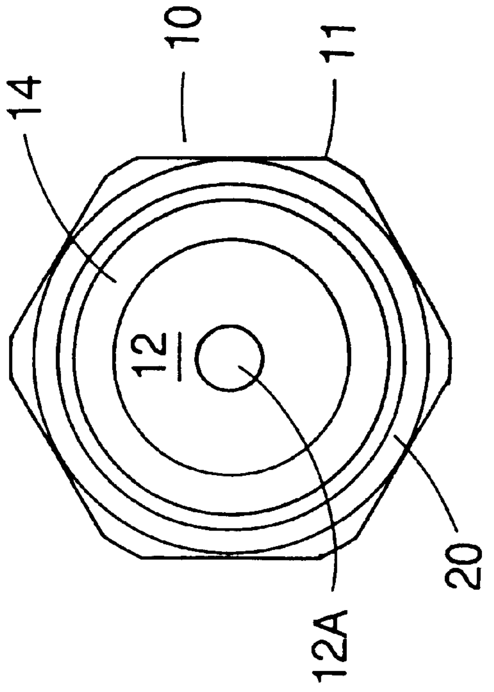
FIG. 1A is one end view of Applicant's present invention.

Applicant provides for a nonunion, one-piece joinder member (10) to engage a nitrogen gas regulator to a $CO_2$ bottle or to otherwise connect a gas high pressure source to a low pressure port.

Turning now to FIGS. 1, 1A, 1B, and 2, it is seen that adapter 10 includes joinder housing (11) which is generally cylindrical and made of brass or other suitable material. The joinder member is used with a floating sealing member, such as a fiber washer (12) having a washer hole (12*a*) therein, the washer, for example, made of vulcanized fiber, such as those available from Seastrom Mfg. of Twin Falls, Id. An O-ring (14) or other washer retainer means is sometimes used to assist in holding the washer in position within joinder housing (11).

Turning now to details of joinder housing (11), it is seen that joinder housing (10) has an outer surface (16) and an inner surface (18). Further, it is seen that joinder housing (10) has a first end (20) and a second end (22). The inner surface has walls defining a communication channel (24) which allows for gaseous communication between the first end and the second end of the joinder member. A portion of the inner surface at or near the first end (20) of communication channel (24) is defined by first end threads (26). Likewise, a portion of inner surface (18) at the second end (22) is defined by second end threads (28). The diameter of first end (D1) as defined by first end threads (26) is, typically, larger than diameter (D2) of second end as defined by second end threads (28).

Thus, it is seen that communication channel (24) to first end has a larger diameter and that a second end has a smaller diameter. Between the first end and the second end, communication channel (24) includes walls defining shoulder (30). Washer (12) has a diameter dimensioned for receipt within the first end but which will rest against shoulders in the manner as set forth in FIG. 1.

Figure 2:
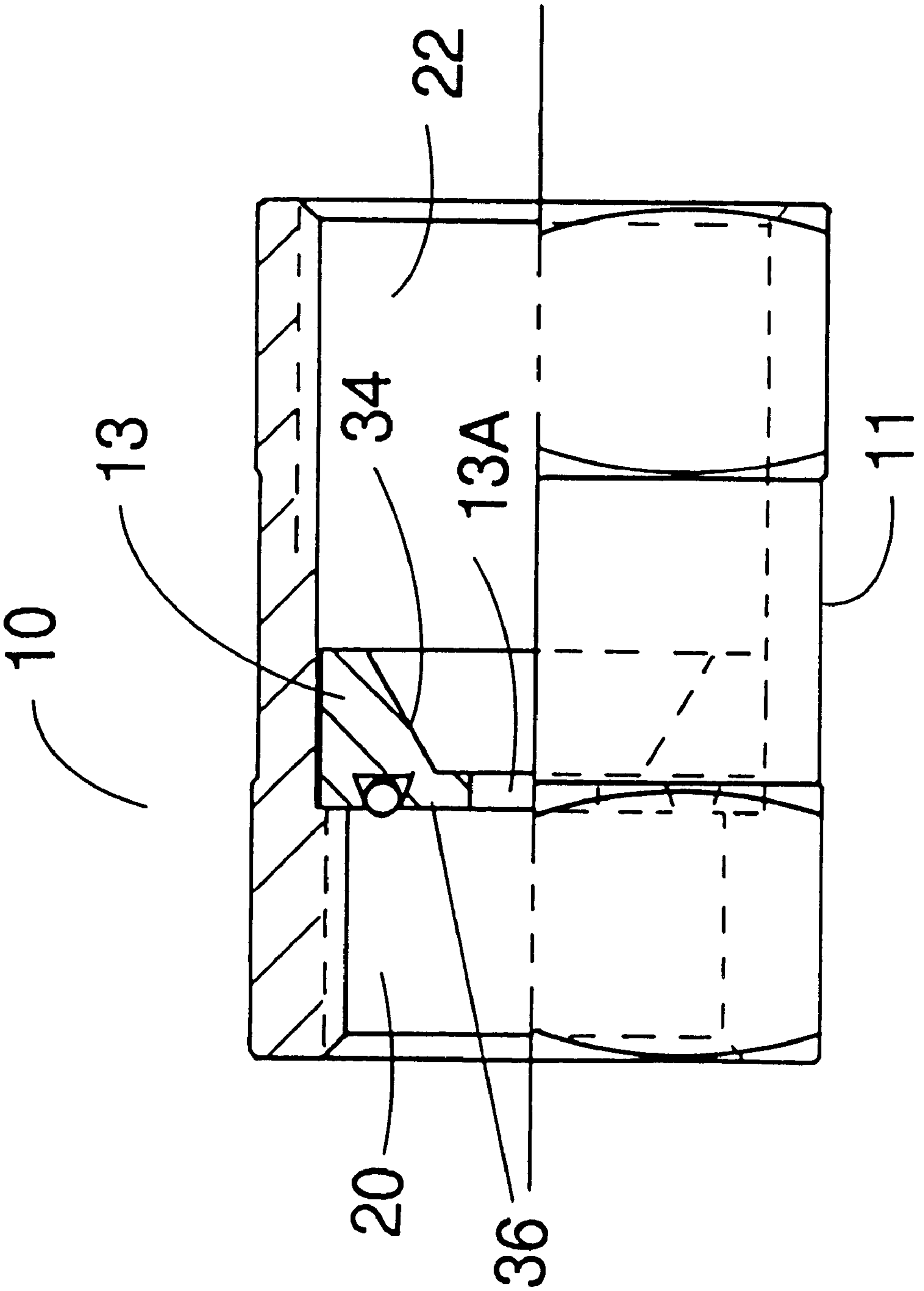
FIG. 2 is a side view of an alternative configuration of Applicant's present invention.
Figure 3:
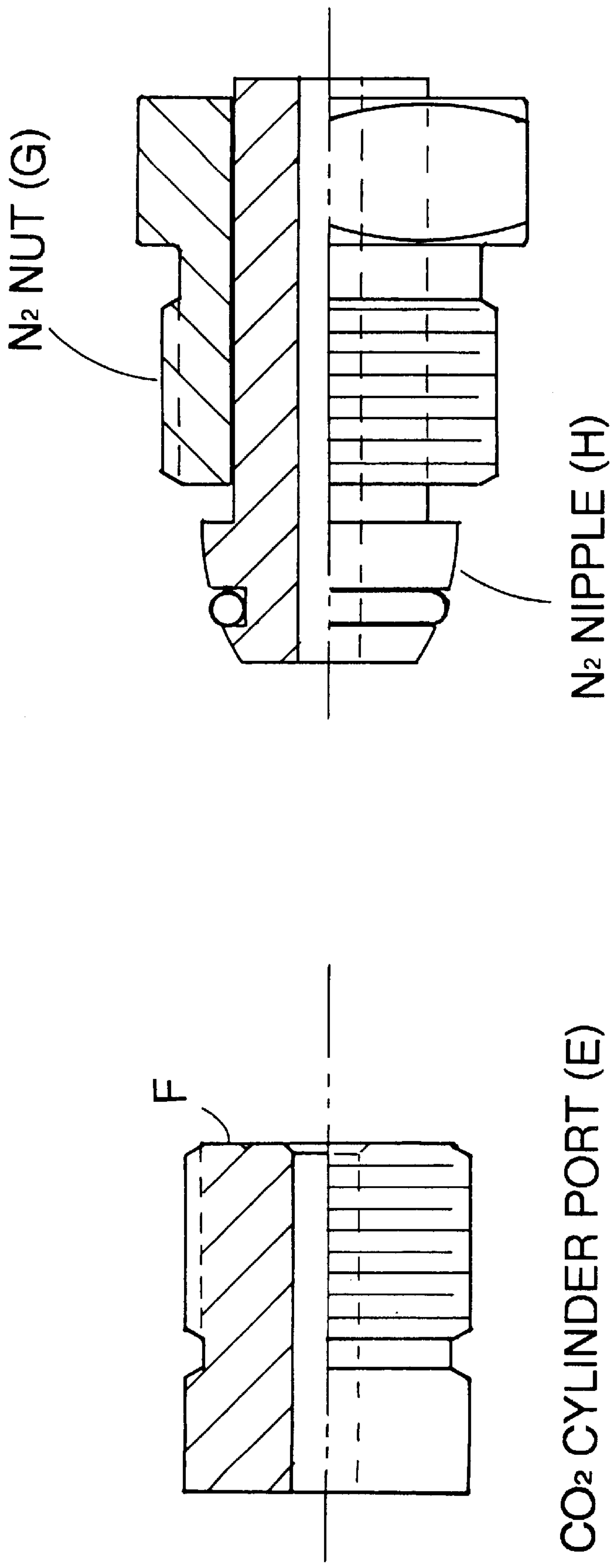
PRIOR ART FIGURE 3
FIG. 3 is a prior art adapter.

In FIG. 2 washer (12) is replaced by another floating sealing member, here a machined brass (or other suitable material) member (13) with walls allowing member (13) to fit slidable within communication channel (24) between the two threaded ends (20)(22). Machined member (13) has walls (34) sometimes referred to as nipple engaging walls dimensioned to receive $N_2$ nipple (H) and to engage, in gas sealing relation, the "O" ring on the nipple. Machined member (13) also has a hole 13A therethrough. Opposite walls (34) are port engaging walls (36) for engaging $CO_2$ port (E) in gas sealing relation. Either port (E) and/or walls (36) may have an "O" ring or other gas sealing means engaged therewith.

Applicant has invented a non-union adapter to engage two ports, none, one or both which may be nipple shaped, but one of which has a non-union captive nut threaded to engage one end of the housing member of the adapter. The other end of the housing member is, after the captive nut has been secured with the housing and the two move as a unit, threaded onto the second port until the walls of that second port engage the floating member, continued tightening will thereafter seal the floating member between the two ports in gas sealing relation.

Terms such as "left," "right," "up," "down," "bottom," "top," "front," "back," "in," "out," and like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

What is claimed is:

1. An adapter for joining in gas sealing relation a first gas port to a second, high-pressure gas source port, one of the two ports having a captive nut, the captive nut having a threaded portion thereon, the adaptor comprising:

a housing member having an exterior surface and an interior surface, and a first end and a second end, the first end and the second end having threads, the interior surface including walls defining a communication channel between the two ends; and a sealing member dimensioned to fit slidably within the communication channel, the sealing member having a first face for sealing against, in gas tight relation, the first gas port and a second face for sealing, in gas tight relation, to the second gas port.

2. The adapter of claim 1, wherein the housing member comprises a single piece of machined metal with at least part of the exterior surface shaped to receive a wrench and where in the sealing member includes a fiber washer with a hole therethrough.

3. The adapter of claim 1, wherein the housing member comprises a single piece of machined metal with at least part of the exterior surface shaped to received a wrench and wherein the sealing member includes a machined metal member with a hole therethrough.

4. The adapter of claim 2, wherein the walls defining the communication channel include walls defining a shoulder dimensioned to receive the fiber washer thereagainst.

5. The adapter of claim 3, wherein the walls defining the communication channel include walls defining a shoulder dimensioned to receive the machined metal member thereagainst.

6. The adapter of claim 2, wherein the interior surface of the first end is threaded to receive the thread portion of the captive nut.

7. The adapter of claim 3, wherein the interior surface of the first end is threaded to receive the thread portion of the captive nut.

8. A kit for controlling gas flow from a $CO_2$ compressed gas cylinder having a high pressure port including a threaded male member, the kit comprising:

an $N_2$ gas regulator having an inlet port, the inlet port including a captive nut, the capture nut including a wrench receiving surface and having a threaded male portion thereon;

a housing member having an exterior surface and an interior surface, the interior surface of the housing member having walls defining a threaded first end and a threaded second end, the first end having a diameter dimensioned to threadably engage the threaded male member of the high-pressure port and the second end having a diameter dimensioned to threadably engage the threaded male portion of the captive nut, and walls defining a communication channel between the two ends; and a sealing member dimensioned to fit slidably within the communication channel, the sealing member having a first face for sealing against, in gas tight relation, the high-pressure $CO_2$ port and a second face for sealing, in gas tight relation, to the inlet port of the $N_2$ gas regulator.

* * * * *